United States Patent Office 3,682,718
Patented Aug. 8, 1972

3,682,718
METHOD OF PREPARING CONCRETE REINFORCING ELEMENTS
Bert E. Palm, Mentor, and Victor V. Germano, Mentor-on-the-Lake, Ohio, assignors to Diamond Shamrock Corporation, Cleveland, Ohio
No Drawing. Filed July 24, 1970, Ser. No. 58,153
Int. Cl. C23f 7/26
U.S. Cl. 148—6.2      4 Claims

ABSTRACT OF THE DISCLOSURE

Concrete reinforcing elements are coated prior to their use with concrete. The coating comprises a pulverulent metal in intimate mixture with the residue from a composition containing an organic component plus a hexavalent-chromium-providing substance. The coating provides excellent corrosion resistance for the reinforcing elements and further affords enhanced adhesion for concrete to the coated element.

BACKGROUND OF THE INVENTION

For retarding corrosion of ferruginous concrete reinforcing elements such elements may be coated, as for example before storage or use. Exemplary corrosion resistant reinforcing elements having a surface coating of wholly inorganic origin have been discussed in U.S. 3,418,175; and, the coating of such elements with a slurry containing a hydraulic cement and rubber has been shown in U.S. 3,030,664. The use in rust-proofing of reinforcing elements with a cementitious material has apparently been of considerable interest, for example such materials have been shown in U.S. Pats. 2,535,100 and 2,591,625.

Rust-proofing coatings for reinforcing elements have also used sodium chromate, e.g., as taught in U.S. Pat. 2,591,625 and 2,611,945 for improving the corrosion inhibiting property of the protective film. The sodium chromate is typically employed with a number of other ingredients in a somewhat complex blend providing only very minor amounts of the chromate. In general such prior coating techniques, in addition to providing somewhat complex and expensive coating formulations, can further involve tedious processing methods.

Teachings directed to providing corrosion resistant coatings on metallic surfaces with, for example, chromic acid and a carboxylic acid, are present in U.S. Pat. 3,382,081. These teachings though are not directed to coating concrete reinforcing elements, and the corrosion resistance provided with such compositions on these elements may be undesirable.

SUMMARY OF THE INVENTION

It has now been found that ferruginous concrete reinforcing elements can be quickly and efficiently coated in a process readily adapted to commercial production line technique, with coatings providing excellent corrosion resistance. Moreover, such coatings additionally provide the concrete reinforcing element with enhanced adhesion to the concrete.

Broadly, the method comprises establishing on said element a coating composition comprising pulverulent metal in intimate mixture with a hexavalent-chromium-containing composition containing hexavalent-chromium providing substance in liquid medium, and heating the element at a temperature and for a time, sufficient to vaporize volatile constituents from the composition and deposit on the element a corrosion resistant coating composition residue. The pulverulent metal consists of zinc, aluminum, magnesium, manganese, mixtures thereof and alloys of same.

Also, the coating composition contains, when such composition has above about 5 weight percent miscible water, basis total weight of liquids in the medium, at least one non-aromatic carboxylic compound selected from the group consisting of: (1) carboxylic acids, anhydrides thereof, where such exist, and ammonium salts thereof where such exist, wherein such acids are selected from the group consisting of saturated and unsaturated monocarboxylic acids, dicarboxylic acids, and polycarboxylic acids having at least three carboxyl groups per molecule, and mixtures thereof; and (2) mixtures of the carboxylic compound with not substantially above about 40 weight percent, basis the weight of the organic component, of additional compound selected from the group consisting of succinimide, acrylamide, aspartic acid, and their mixtures, there being in the organic component not more than 90 weight percent, basis total weight of said component, of succinic acid.

Further the invention relates to the process of preparing reinforced concrete with corrosion resistant reinforcing elements prepared in accordance with invention principles.

For convenience, the hexavalent-chromium-containing coating composition, that is, a liquid medium containing a hexavalent-chromium-providing substance, and which may contain the organic component as is explained more fully hereinbelow, is hereafter often referred to as simply the "coating composition." It is also meant herein that "ferruginous concrete reinforcing elements" include such materials as iron and steel reinforcing wire, reinforcing bars and/or iron and steel reinforcing cable.

DESCRIPTION OF THE PREFERRED EMBODIMENTS

The concrete reinforcing elements are coated with a composition that is in a liquid medium which is generally water, or water plus tertiary butyl alcohol. However other liquids can be used, typically other alcohols and these can be used in conjunction with high boiling organic hydrocarbon compounds. Also, organic chlorinated hydrocarbon liquids may be used alone, or in blends. But immiscible blends, e.g., of water and perchloroethylene, are not suitable and thus are not used for the liquid medium. In selection of the liquid medium, economy is of major importance, and thus such medium most always contains readily commercially available volatile liquids, that is liquids which boil at or below about 100° C. at atmospheric pressure.

When the liquid medium contains a very minor amount of miscible water, that is, not substantially above about 5 weight percent water, basis total weight of the liquids in the medium, the coating composition can be free from an organic component. An organic component may be added to such a coating composition but, for economy, such addition is typically not made. It has been found that when the liquid medium of the coating composition contains above about 5 weight percent miscible water, that the addition of an organic component desirably enhances the corrosion resistance provided for the reinforcing elements. Thus the coating compositions which contain an organic component will virtually always contain greater than about 5 weight percent water and such liquid medium can be all water.

In the liquid medium the hexavalent-chromium-providing substance is chromic acid, and by that is meant that at least a major amount of such substance is chromic acid, since chromium can be supplied in minor amounts by salts such as ammonium, sodium or potassium dichromate. Additionally, the providing substance might contain very minor amounts, for example ten percent or less, of trivalent chromium compounds. The providing substances in the liquid medium are present in an amount sufficient to provide between about 20–500 grams per liter of coating composition of hexavalent chromium, expressed as $CrO_3$, and preferably to provide, for efficiency and economy, between about 30–200 grams per liter of hexavalent chromium.

The organic component is supplied by one or more non-aromatic mono-, to poly-, functional carboxylic acid. These substances are typically present in the coating composition in an amount less than about 100 grams per liter of such composition and advantageously for economy are present in an amount less than about 70 grams per liter. Preferably for best economy, such compounds provide a total organic component for the coating composition between about 1–50 grams per liter.

The useful monocarboxylic acids, which are not branched chain or alicyclic, are essentially always the $C_2$–$C_{30}$ fatty acids and most usually are those which are readily commercially available, e.g., capric, caprylic, stearic, and palmitic, which can be mixtures of such acids often containing 40 weight percent up to 90 weight percent or more of the principal acid in mixture typically with other fatty acids, but sometimes also mixed with minor amounts of unsaturated aliphatic fatty acids.

Additional non-aromatic monocarboxylic acids include aliphatic branched chain monocarboxylic acids, for example, isovaleric, pivalic, 2 - methylbutanoic, a-ethylcaproic, diethylmethylacetic, and their mixtures, and also such acids include alicyclic monocarboxylic acids, e.g., cyclopropanoic, cyclopentanoic, chaulmoogric, and mixtures thereof.

The useful non-aromatic dicarboxylic acids for the organic component are such acids as correspond to the structure $HOOC-(CH_2)_n-COOH$ wherein $n$ is 2 to 12 inclusive. Thus, when such acids are straight chain aliphatic acids the useful acids include succinic acid, glutaric acid, adipic acid, pimelic acid, and the like up through 1,14 - tetradecanedioic acid. Additionally, branched chain saturated aliphatic carboxylic acids corresponding to the above structure which may be used in the practice of this invention include 2,3-dimethylsuccinic acid, 2,3-dimethylglutaric acid, 2-ethylsuberic acid, or their mixtures.

It has also been found that when succinic acid is used, such acid should not supply more than about 90 percent of the total weight of the organic component. In this regard, additional acids can supply the balance of the organic materials which are present in the liquid medium, but it has also been found that such balance of organic materials can include one or more substances such as succinimide, acrylamide, aspartic acid, and mixtures of such compounds. Also, these latter substances can be used in the organic component with any or all of the other acids, but they do not supply above about 40 weight percent of such component as otherwise the coating on the reinforcing element may not have highly desirable adhesion to such element.

Suitable saturated polycarboxylic acids, that is having more than two carboxyl groups per molecule, include tricarboxylic acids having at least five carbon atoms, and such acids include tricarballylic acid, 1,3,5 - tricarboxypentane, and their mixtures. In addition to these trifunctional acids, the useful saturated polycarboxylic acids include acids having an average of more than three carboxyl groups per molecule and which may be aliphatic, e.g., linear, or alicyclic, e.g., crosslinked, including polyacrylic acids which can be water soluble or water dispersible, as well as water soluble ethylenemaleic anhydride copolymers, i.e., linear acids of same as well as linear crosslinked anhydrides thereof.

Furthermore, the carboxylic compound for the organic component can be made up with an unsaturated monocarboxylic acid which maye be a monoethenoid fatty acid, for example, caproleic, 10-undecylenic, oleic, elaidic, erucic, brassidic, and their mixtures. Such unsaturated monocarboxylic acids can also be di-, tri-, and polyethenoid fatty acids, for example, sorbic linoleic, linolenic, arachidonic, and their mixtures. Moreover, these unsaturated monocarboxylic acids may be ethynoid fatty acids such as stearolic and behenolic. Preferably, for enhanced coating durability for the coating composition residue the ethynoid fatty acids are such acids containing more than about six carbon atoms.

Other acids which can make up the carboxylic compound portion of the organic component include unsaturated polycarboxylic acids, for example aconitic acid and the so-called "trimer" acids. Such trimer acids are mixtures of dimer and trimer acids but are preponderantly, e.g., 75–80 weight percent, trimer acids, i.e., tricarboxylic acids, and are ostensibly unsaturated, being formed by the polymerization of generally $C_{18}$ unsaturated fatty acids. Additional polycarboxylic acids are those having an average of more than three carboxyl groups per molecule such as polymerized maleic acid.

It is to be understood that for all of the foregoing carboxylic acids, such acids can be furnished in the coating composition in the form of their anhydride precursors where such exist. Moreover, the ammonium salts of such acids may also be employed in like manner where such exit. Thus, as used herein, the term "carboxylic acid" is meant to include the respective anhydride and/or ammonium salt of such acid.

The metals for the pulverulent metal may be referred to as the less noble metals, i.e., magnesium, aluminum, manganese and zinc as well as their alloys, e.g. zinciferous and aluminiferous metals, and additionally may include mixtures of any such metals. Preferably for economy and efficiency such metals are zinc or aluminum or their mixtures. The pulverulent metal can be flake or powder or both and should have particle size such that all particles pass 100 mesh and a major amount pass 325 mesh ("mesh" as used herein in U.S. Standard Sieve Series). When such metals are present in the coating composition, it typically contains between about 50–1000 grams per liter of such metals.

In the coating on the concrete reinforcing element the chromium, expressed as chromium and not as $CrO_3$, is usually present in an amount above about 10 milligrams per square foot to impart enhanced corrosion protection for the reinforcing element, but for economy the coating advantageously does not contain above about 500 milligrams per square foot of chromium. Also for economy such coating advantageously does not contain above about 5000 milligrams per square foot of pulverulent metal and further for significant enhancement in corrosion protection contains above about 100 milligrams per square foot of pulverulent metal. Generally chromium, expressed as chromium and not $CrO_3$, is present in an amount between about 20–200 milligrams per square foot and the metal is present in an amount between about 100–2000 milligrams per square foot of coated surface.

The heavier concentrations of pulverulent metal in the coating, or even all the metal in the coating, can be obtained by application of such metal separate from application of the coating composition. This separate application of pulverulent metal will typically be as a dispersion of such metal in a liquid, e.g., one of the volatile liquids discussed hereinbefore. Such dispersion will usually contain merely pulverulent metal and surface active agents in a volatile liquid.

The composition may also contain surface active agents including dispersing agents, suspending agents, defoaming agents, and wetting agents which are generally employed in amounts less than about 10 percent by volume of the composition. Such agents may typically be hydroxyl-containing hydrocarbon ethers which include the alkyl ethers of alkylene glycols or agents containing lignin sulfonic acids. The coating composition and any separate application of pulverulent metal in liquid medium, can be applied to the concrete reinforcing element by any of the methods conventionally used for coating such elements with a liquid, for example dip coating, curtain coating, brush coating, pressure spray or combinations of such techniques as for example spray and brush techniques.

After application of the coating to the concrete reinforcing element the preferred temperature range for the subsequent heating, which may be preceded by drying such as air drying, is from about 200° F., but more typically at normal pressure from about 250° F. up to about 1000° F. However such heating often achieves a temperature of the coated reinforcing element within the range of about 450°–900° F. At the elevated temperatures the heating can be carried out at a fraction of a second, e.g., as rapidly as about 0.25 second or less, but is generally conducted for slightly longer time, such as about one minute at a more reduced temperature.

The thus coated reinforcing elements are thereby ready for storage or for subsequent imbedding in concrete such as light-weight concrete or like masses, and the reinforcing element is desirably united thereby in a bond of enhanced adhesion between the coated element and the concrete during settling and/or curing of the concrete. In addition to affording such augmented bond between the reinforcing element and the concrete the coating provides excellent corrosion resistance for the reinforcing element prior to imbedment and further offers desirable rust protection for the elements after they are imbedded in the concrete.

The following example shows a way in which the invention has been practiced but should not be construed as limiting the invention.

EXAMPLE

Five reinforcing steel rods ¼" in diameter and 18" long are coated with a coating composition containing 40 g./l. (grams per liter) of $CrO_3$ supplied by chromic acid, 15 g./l. succinic acid, 7.5 g./l. succinimide, 200 g./l. of powdered zinc having an average particle size of 3 microns, 83 g./l. of water all of which is diluted to 1 liter with tertiary butyl alcohol. The rods are coated by dipping into the coating composition, removing the rods from the composition and draining excess composition therefrom. The coating is subsequently cured in a convection oven for 20 minutes with the rod reaching a temperature of 400° F. Before coating the rods are prepared for coating by scrubbing with a porous cleaning pad which is a fibrous pad of synthetic fiber impregnated with abrasive.

Two rods are subjected to corrosion resistance testing by means of the standard salt spray (fog) test described in ASTM B–17–64. In this test the rods are placed in a chamber kept at constant temperature where they are exposed to a fine spray (fog) of a 5 percent salt solution. The rods are maintained in the chamber for a total period of 256 hours, at which time they are removed, rinsed with warm water and dried and are seen on visual inspection to have zero percent corrosion, which is deemed to be excellent salt spray results.

Two additional rods are subjected to the cycling condensing humidity test which is conducted in a cabinet containing test water that, when the cycle is "on," is heated in the bottom of the cabinet to produce a condition of 100 percent humidity within the cabinet and a temperature for the ambient steam within the cabinet of 120° F. Rods are placed in the cabinet horizontal to the water surface, and about 3 inches above the water surface. The cycle is 2.5 hours "on," and 0.5 hour "off." During the "off" cycle warm air is blown across the rods to insure drying. The test is terminated after 48 hours by removing the rods from the cabinet, air drying, and visually inspecting the rods for pin-hole rust spots on the coated rod surface. By such inspection the rods are seen to be completely free of rust and are thereby regarded as having excellent corrosion resistance in such condensing humidity test.

A comparative coating composition not exemplary of the present invention is prepared by blending together 40 g./l. of $CrO_3$, 7 g./l. of zinc chloride, 200 g./l. of the powdered zinc and 83 g./l. of water all of which is diluted to one liter with tertiary butyl alcohol. This coating composition is thus quite similar to the above described coating composition, but is free from an organic component and the liquid medium contains about 10.4 weight percent water, while further containing zinc chloride for enhancing corrosion resistance of the coating. Such a coating typically provides highly desirable corrosion resistance for coated reinforcing rods. The rods are first cleaned as described hereinabove and are coated with this comparative composition in the manner described above and the coated rods are cured in the manner described above.

These comparative coated rods, as well as rods coated as herein first described in the example, as well as rods which are uncoated, are all subjected to testing for measuring the bond between such reinforcing rods in concrete. The test is conducted in a manner essentially as described in ASTM C–234–62. Briefly, concrete is cast around prepared reinforcing rods in molds with the concrete being mixed in specified manner and thereafter cast in the molds, being careful to provide uniformity among the various test molds used. The thus molded concrete is cured for the same length of time for each molded specimen and in testing the rods are individually removed from the concrete by tensile testing machine. The force required for such removal is measured thereby and such measurements are compared one with the other for determining variation in bonding between coated rods, as well as by comparison with the uncoated rod.

In this test, the rods coated with the comparative composition, that is the composition free from organic constituents but containing the zinc chloride corrosion resistance enhancing substance, are seen to have bonding between the reinforcing steel rod and the concrete comparable to the bonding provided by the uncoated steel reinforcing rod. However the rod coated with the coating composition first described in the example, which rod has seen to afford excellent corrosion resistance in both salt spray and cycling condensing humidity testing, is found to have highly desirable enhanced bonding between the reinforcing steel rod and the concrete. In view of these test results in corrosion resistance and concrete bonding, such coated rods are regarded as being of excellent suitability for reinforcing concrete.

We claim:
1. The method of preparing coated ferruginous concrete reinforcing elements having corrosion resistance and adhesion for concrete to the coated element, which method comprises:
   (1) establishing on said element a coating composition that, with the below-defined proviso, consists essentially of pulverulent metal in intimate mixture with a hexavalent-chromium providing substance in liquid medium, said substance supplying below about 500 milligrams of chromium per square foot of element surface; and
   (2) heating said element at a temperature and for a time, sufficient to vaporize volatile constituents from said composition and deposit on said element the corrosion resistant coating composition residue;
wherein said pulverulent metal is present in an amount not substantially above about 5,000 milligrams per square foot of element surface and is selected from the group consisting of zinc, aluminum, magnesium, manganese, mixtures thereof and alloys of same, and with the proviso that there is present in the coating composition, when said composition contains above about 5 weight percent miscible water, basis total weight of liquids in said medium, below about 100 grams per liter of organic component of at least one non-aromatic carboxylic compound selected from the group consisting of:
   (A) carboxylic acids, anhydrides thereof, where such exist, and ammonium salts thereof where such exist, wherein such acids are selected from the group consisting of saturated and unsaturated monocarboxylic acids, dicarboxylic acids, and polycarboxylic acids having at least three carboxyl groups per molecule, and mixtures thereof; and (B) mixtures of said carboxylic compound with not substantially above about 40 weight percent, basis the weight of said organic component, of additional compound selected from the group consisting of succinimide, acrylamide, aspartic acid, and their mixtures, there being in said organic component not more than 90 weight percent, basis total weight of said component, of succinic acid.

2. The method of claim 1 wherein said pulverulent metal is established on the surface of said element after application of said coating composition thereto and said element is heated at a temperature not substantially above about 1,000° F. and for a time of at least about 0.25 second.

3. The method of claim 1 wherein said pulverulent metal is applied to said element as part of said coating composition and in an amount sufficient to provide above about 100 milligrams per square foot of element surface of said pulverulent metal, said coating composition further providing above about 10 milligrams per square foot of chromium.

4. The method of claim 1 wherein said dicarboxylic acids have the structure:

$$HOOC(CH_2)_n—COOH$$

wherein $n$ is a whole number from 3 to 12, inclusive.

References Cited
UNITED STATES PATENTS

| | | | |
|---|---|---|---|
| 2,662,838 | 12/1953 | Oven | 148—6.16 |
| 3,325,432 | 6/1967 | Kellert | 148—6.2 X |
| 3,382,081 | 5/1968 | Cutter et al. | 148—6.2 X |

RALPH S. KENDALL, Primary Examiner

U.S. Cl. X.R.

117—128